(12) United States Patent
Crenshaw et al.

(10) Patent No.: US 10,851,025 B2
(45) Date of Patent: Dec. 1, 2020

(54) WATERBORNE WET LOOK COATING COMPOSITION

(71) Applicant: SWIMC LLC, Cleveland, OH (US)

(72) Inventors: Brent Crenshaw, Woodstock, IL (US); Stacey Sara, St. Louis, MO (US); Glenn Frazee, Marengo, IL (US)

( * ) Notice: Subject to any disclaimer, the term of this patent is extended or adjusted under 35 U.S.C. 154(b) by 7 days.

(21) Appl. No.: 15/702,993

(22) Filed: Sep. 13, 2017

(65) Prior Publication Data

US 2018/0002241 A1 Jan. 4, 2018

Related U.S. Application Data

(63) Continuation of application No. PCT/US2016/022875, filed on Mar. 17, 2016.

(Continued)

(51) Int. Cl.
| | | |
|---|---|---|
| C04B 41/00 | (2006.01) | |
| C04B 41/48 | (2006.01) | |
| C09D 125/14 | (2006.01) | |
| C09D 133/08 | (2006.01) | |
| C09D 133/10 | (2006.01) | |
| C09D 133/12 | (2006.01) | |
| C04B 41/63 | (2006.01) | |
| C04B 41/71 | (2006.01) | |
| C04B 41/52 | (2006.01) | |

(52) U.S. Cl.
CPC ......... *C04B 41/483* (2013.01); *C04B 41/009* (2013.01); *C04B 41/4876* (2013.01); *C04B 41/52* (2013.01); *C04B 41/63* (2013.01); *C04B 41/71* (2013.01); *C09D 125/14* (2013.01); *C09D 133/08* (2013.01); *C09D 133/10* (2013.01); *C09D 133/12* (2013.01)

(58) Field of Classification Search
CPC ..... C04B 41/483; C04B 41/71; C04B 41/009; C04B 41/52; C04B 41/63; C04B 41/4876; C09D 125/14; C09D 133/12; C09D 133/10; C09D 133/08
See application file for complete search history.

(56) References Cited

U.S. PATENT DOCUMENTS

| | | | |
|---|---|---|---|
| 6,548,596 B1 | 4/2003 | Kohr et al. | |
| 2003/0035917 A1* | 2/2003 | Hyman | B41M 5/36 428/67 |

(Continued)

FOREIGN PATENT DOCUMENTS

| | | |
|---|---|---|
| CN | 101332456 | 12/2008 |
| GB | 953456 | 3/1964 |
| WO | WO2016149499 | 9/2016 |

OTHER PUBLICATIONS

International Search Report and Written Opinion for International Application No. PCT/US2016/022875, dated Jun. 21, 2016, 7 pages.

(Continued)

*Primary Examiner* — Hai Y Zhang
(74) *Attorney, Agent, or Firm* — Mueting Raasch Group

(57) ABSTRACT

A water-based coating composition is described herein. The composition includes an aqueous dispersion derived from an ethylenically unsaturated monomer and one or more organic solvents. The composition when applied to a substrate and allowed to dry provides a wet look to the substrate.

21 Claims, 1 Drawing Sheet

Related U.S. Application Data

(60) Provisional application No. 62/134,073, filed on Mar. 17, 2015, provisional application No. 62/309,201, filed on Mar. 16, 2016.

(56) References Cited

U.S. PATENT DOCUMENTS

| | | | | |
|---|---|---|---|---|
| 2004/0058284 A1* | 3/2004 | Yoneyama | ............ | G03C 7/3225 430/505 |
| 2009/0004398 A1* | 1/2009 | Nitta | ..................... | B05D 5/068 427/407.1 |

OTHER PUBLICATIONS

International Search Report and Written Opinion for PCT/US2016/022875 dated Jun. 21, 2016.
Hvilsted, "Analysis of Emulsion Paints", Progress in Organic Coatings, vol. 13 Jan. 1, 1955. pp. 253-271.
Chinese First Office Action for Chinese Application No. 201680016212.6 dated May 14, 2019. English translation provided.

\* cited by examiner

WATERBORNE WET LOOK COATING COMPOSITION

CROSS REFERENCE TO RELATED APPLICATION(S)

This application is a continuation of International Application No. PCT/US2016/022875 filed on 17 Mar. 2016 and entitled: "Waterborne Wet Look Coating Composition," which claims priority from U.S. Provisional Application No. 62/134,073 filed 17 Mar. 2015 and entitled: "Water-Based Wet Look Coating Composition," and U.S. Provisional Application No. 62/309,201 filed 16 Mar. 2016 and entitled: "Waterborne Wet Look Coating Composition," each of which is incorporated herein by reference in its entirety.

BACKGROUND OF THE INVENTION

Certain substrates, including porous or cementitious substrates, such as concrete, brick, masonry, stone, and the like, often experience damage from weather and from exposure to water. Conventionally, to avoid such damage, these substrates are sealed by the application of a coating composition that prevents penetration of water into these materials. Additionally, coatings are often applied to obtain a certain desirable look. It is often desirable for the sealant to provide an appearance that the substrate is wet with water or "wet look."

Many of the sealers currently available on the market are based on acrylic technology. Many solventborne sealers leave the material with a wet look, but to our knowledge waterborne acrylic sealers do not provide the true wet look desired for these substrates. Many products claim to impart a wet look but fail to achieve the deepening or enhancement of color expected. Moreover, products that exhibit an optimal wet look are often deficient in other coating properties desired for such sealer compositions. Waterborne materials are desirable in these applications for many reasons including convenience of water based clean-up, lower amounts of volatile organic solvents, and reduced odor.

From the foregoing, it will be appreciated that what is needed in the art is a water-based acrylic composition that provides an optimal wet look when applied to a cementitious substrate or articles, but without sacrificing other desirable coating properties. Such coated articles, compositions and methods for preparing the same are disclosed and claimed herein.

SUMMARY

Figure 1:
FIG. 1 is a photographic representation of a top view of two concrete pavers.

The present description provides a coating composition that when applied to a cementitious substrate and allowed to dry, provides a wet look.

In one embodiment, the composition described herein includes an aqueous dispersion derived from at least one ethylenically unsaturated monomer, wherein the polymer has a Tg of greater than 0° C. The composition also includes one or more organic solvents having a boiling point of between 210° C. and 300° C.

In one embodiment, the composition described herein includes an aqueous dispersion derived from at least one ethylenically unsaturated monomer, wherein the polymer has a Tg of greater than 0° C. The composition includes a combination of two or more organic solvents. The first solvent has a boiling point of about 120° C. to 210° C., and the second solvent has a boiling point of about 210° C. and 300° C.

Coated articles made using the coating composition are also described herein, as well as methods for coating such articles using the coating composition described herein.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the accompanying drawings and/or the description below. Other features, objects, and advantages of the invention will be apparent from the description and drawings, and from the claims.

SELECTED DEFINITIONS

Unless otherwise specified, the following terms as used herein have the meanings as provided below.

The term "double bond" is non-limiting and refers to any type of double bond between any suitable atoms (e.g., C, O, N, etc.). The term "ethylenically unsaturated" is used to describe compounds having carbon-carbon double bonds herein.

The term "substituted," as used herein means that a hydrogen atom or other organic functional group in a hydrocarbon compound or other organic compound described herein has been replaced by another functional group by means of a substitution reaction. For example, replacement of a hydrogen atom in an open chain hydrocarbon compound with a methyl (—CH$_3$) group means the hydrocarbon has been methyl-substituted. The term "group" is used interchangeably with "functional group" herein and describes a chemical substituent where the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc.

The term "crosslinker" refers to a molecule capable of forming a covalent or ionic linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent or ionic linkage therebetween. Typically, this crosslinking reaction occurs through reaction of complimentary reactive functional groups present on the self-crosslinking polymer itself or two separate molecules of the self-crosslinking polymer.

Unless otherwise indicated, a reference to a "(meth) acrylate" compound (where "meth" is bracketed) is meant to include both acrylate and methacrylate compounds.

The term "wet look," as used herein refers to the appearance of a coating when applied to a porous or cementitious surface, and indicates a glossy finish with deepened enhanced colors similar to the appearance of the substrate when it is wet with water. The term "warm look" is used interchangeably with "wet look."

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present description provides a composition, article or method for obtaining a coating on a substrate. The composition includes an aqueous polymer dispersion and one or more organic solvents or a blend of solvents. When the composition is applied to a substrate and allowed to dry, it provides a wet look to the substrate.

In an embodiment, a wet look composition is provided. In an aspect, the composition includes a dispersion of a polymer or resin component derived from at least one ethylenically unsaturated monomer. The term "dispersion" in the context of a dispersible polymer refers to a dispersible polymer in admixture with a carrier. The term "dispersion" is intended to include the term "solution." In an aspect, the dispersion described herein is an aqueous dispersion, i.e. a mixture of a dispersible polymer and an aqueous carrier, preferably water. The composition described herein may be a single phase dispersion, wherein the polymer is fully dispersed in the aqueous carrier. Alternatively, the composition described herein may include two or more phases, wherein one or more phases are dispersed in a continuous phase of another material or another phase. A dispersion may also be in the form of a suspension, such as a colloidal suspension, for example. In an aspect, the polymer dispersion described herein may be a water-reducible dispersion, where the polymer is dispersed in water without the aid of a surfactant, although surfactants may be used if desired. In an alternate embodiment, the polymer dispersion described herein may be a latex or emulsion including polymer microparticles dispersed in an aqueous carrier using a surfactant to aid with dispersion.

In an aspect, the composition described herein is a dispersion of a polymer or resin component in a carrier, preferably an aqueous carrier. In a preferred aspect, the aqueous carrier is water, and represents between 10 and 99 wt %, preferably 15 and 95 wt %, more preferably 30 to 90 wt %, based on the total weight of the aqueous dispersion.

In an embodiment, the composition described herein includes a dispersion of a polymer or resin component derived from at least one ethylenically unsaturated monomer. In an aspect, the polymer may be a homopolymer derived from one ethylenically unsaturated monomer, or a copolymer derived from two or more ethylenically unsaturated monomers, including monomers selected from acrylic acid, $C_1$-$C_{22}$ esters of acrylic acid, substituted $C_1$-$C_{22}$ esters of acrylic acid, methacrylic acid, $C_1$-$C_{22}$ ester of methacrylic acid, substituted $C_1$-$C_{22}$ esters of methacrylic acid, styrene, α-methyl styrene, acrylamide, N-substituted alkyl acrylamide, vinyl toluene, vinyl acetate, vinyl versatate, $C_1$-$C_{22}$ vinyl esters, $C_1$-$C_{22}$ esters of maleic acid, vinyl propionate, allyl methacrylate, and mixtures thereof. Examples include, without limitation, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide, acrylamide, methacrylamide, methylol (meth)acrylamide, styrene, α-methyl styrene, vinyl toluene, vinyl acetate, vinyl propionate, allyl methacrylate, and mixtures thereof In a preferred aspect, the polymer described herein includes at least one acrylic monomer, preferably methyl methacrylate, methacrylic acid, 2-ethylhexyl acrylate, acetoacetoxy ethyl methacrylate, butyl acrylate, and the like.

In an aspect, the polymer described herein has a Tg of greater than about 0° C., preferably 10° C. to 80° C., more preferably 20° C. to 60° C. In an aspect, the polymer is a single stage composition with Tg greater than about 0° C.

Conventionally, higher molecular weight polymers are preferred for coating compositions. In contrast to convention, however, the polymers used in the composition described herein are low- to medium-molecular weight polymers. Accordingly, in an embodiment, the polymer described herein has a total weight average molecular weight (Mw) of less than about 100,000, preferably less than about 50,000. In an aspect, the polymer described herein as total molecular weight (Mw) of about 5,000 to 50,000, preferably 15,000 to 40,000, more preferably 10,000 to 30,000.

In an embodiment, the composition described herein includes about 10 to 90 wt %, preferably 20 to 80 wt %, more preferably 40 to 70 wt % of the polymer described herein, based on the total weight of the dispersion, not including the aqueous carrier.

In an embodiment, the polymer described herein may be made by conventional methods known to those of skill in the art. Such methods include, for example, bulk polymerization, solution polymerization, latex polymerization, and the like.

In some embodiments, where the polymer described herein is not self-crosslinking, the coating composition may optionally include a crosslinker. Suitable crosslinkers include, for example, compounds that include functional groups that can react with functional groups on the polymer backbone. Examples include, without limitation, aminoplasts, phenoplasts, blocked isocyanates, and combinations thereof. The choice and amount of crosslinker will depend on the formulation and properties desired for the ultimate coating.

The composition, article and method described herein provides a coating composition including a combination of one or more organic solvents, preferably solvent(s) low in volatile organic compound (VOC) content. In an aspect, the composition described herein includes at least one organic solvent with a boiling point between 150 and 350° C., preferably from 210 to 300° C., although organic solvents with boiling points lower than 150° C. and higher than 350° C. may also be used.

In some embodiments, the composition may include two or more solvents, or a blend of solvents. In an aspect, the composition includes a first solvent and a second solvent. The first solvent is a mid-boiling solvent having a boiling point preferably from 120 to 210° C., more preferably from 140 to 180° C. The second solvent is a high-boiling solvent having a boiling point from 210 to 300° C., preferably 180 to 260° C. In a preferred aspect, the first solvent has a boiling point of not less than about 130° C. and the second solvent has a boiling point of not more than about 260° C.

In an embodiment, the composition described herein includes about 1 to 60 wt %, preferably 5 to 55 wt %, more preferably 10 to 50 wt % of the one or more solvents or blend of solvents, based on the total weight of the dispersion, not including the aqueous carrier.

Suitable solvents include, without limitation, aliphatic hydrocarbons, aromatic hydrocarbons, alkyl-substituted aromatic hydrocarbons, alkylene-substituted hydrocarbons, glycol ethers, alkyl-substituted glycol ethers, aryl-substituted halides, ester alcohols, ketones, esters, and the like. In a preferred aspect, the one or more solvents or blend of solvents include dialkyl benzene, trialkyl benzene and combinations thereof (commercially available as AROMATIC 100, for example), dipropylene glycol n-butyl ether (commercially available as DOWANOL DPnB, for example), p-chlorobenzotrifluoride (commercially available as OXOL 100, for example), ester alcohol (commercially available as TEXANOL), propylene glycol, and mixtures or combinations thereof.

Conventionally, when coating compositions are applied on porous substrates such as cementitious substrates, for example, a true wet look is not obtained. The substrate may appear to have a wet look, but may not be sufficiently glossy. On the other hand, the substrate may have optimal gloss, but the wet look is suboptimal. It is believed that low mobility of the polymer due to polymer entanglement, high Tg, and/or the rapid evaporation of solvent prohibit the polymer from penetrating or completely wetting out the substrate to provide a wet look. Similarly, if the Tg and molecular weight are too low or the solvent evaporates too slowly, the resulting film may provide a wet look, but is too soft or does not cure or dry properly and remains tacky for too long.

The coating composition described herein provides both an optimal wet look and sufficient gloss when applied to a substrate and allowed to dry. Without limiting to theory, it is believed that careful control of both polymer structure and the evaporation rate of the solvent will produce an optimal wet look. The development of a wet look may be controlled by careful selection of polymers with appropriate (i.e. low to medium) molecular weights (Mw) and careful selection of solvent(s) with appropriate (i.e. medium to high) boiling point(s) and solvency. The correct selection and combination allows the polymer described herein to remain in solution at a low viscosity until the aqueous carrier evaporates and/or migrates into the substrate. The solvated polymer is then able to wet out the pores of the substrate near the surface to form a continuous film on and within the pores of the substrate.

Figure 2:
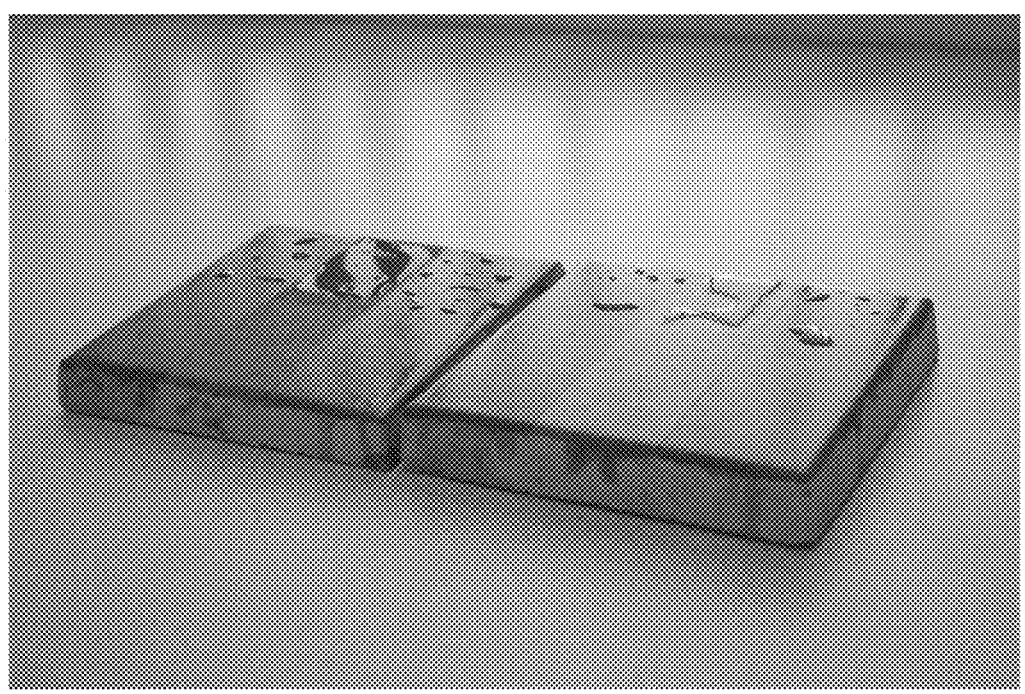
FIG. 2 is a photographic representation of two concrete pavers viewed from a light-reflected angle.

Referring now to the figures, a top view (FIG. 1) and a light-reflected angle view (FIG. 2) of two concrete pavers are shown. In each figure, the left side of each paver is coated with a commercially available solution acrylic sealer, and the right side of each paver is coated with the water-based composition sealer. The center section of the paver on the left has been left uncoated while the center section on the right has been coated with a glossy water-borne sealer. Water has been applied to only the top half of both pavers. With specific reference to the center section of the paver on the left, it can be seen that the top half is darker and the colors enhanced compared to the bottom half, i.e. the top half of the paver has a wet look. The bottom left and bottom right sides of each paver appear similar to the top left and right sides, i.e. the wet portion of the paver, while the center section of the right paver is similar in color to the bottom section and similar in gloss to the other coated sections.

The coating compositions as described herein may be made by conventional methods known to those of skill in the art. Briefly, as described above, the composition described herein is an aqueous dispersion of a polymer made by solution or latex polymerization. The dispersion may be made into a formulation of the coating composition by the addition of adjuvants and other additives conventional in the art. Such additives include, for example, surfactants, fillers, thixotropes, rheological modifiers, and the like.

In an embodiment, the present description provides water-based coating composition. A formulation of the coating composition of a desired color may be made by adding a colorant composition to the composition. In an alternate embodiment, the present description provides water-based coating compositions that are clear, i.e. with no colorant or pigment added.

In an embodiment, the present composition includes a method for coating a substrate, preferably a porous substrate or cementitious substrate. The method includes a method for providing a substrate, and applying to the substrate a coating composition as described herein. Allowing water and other solvents to evaporate from the substrate provides a coating with a wet look.

Accordingly, in an embodiment, the coating composition described herein may be used in a wide variety of applications, including for example, as a water-based sealer for porous architectural or cementitious surfaces or substrates (i.e. walls, ceilings, doors, trim, floors, driveways, walkways etc.), drywall, masonry, pavers, rock, wood, metal, plastics, and primed surfaces. In an aspect, the coating composition described herein is a water-based sealant for cementitious or porous surfaces intended to provide a wet look when the composition is dried. In another aspect, the coating composition described herein is a water-based stain for concrete.

The coating compositions described herein may be applied to one or more surfaces by conventional methods known to those of skill in the art. Suitable examples include, without limitation, application by aerosol spray, brush, roller, airless spray, air-assisted spray, high volume low pressure (HVLP) spray, and the like.

In an embodiment, the coating composition described herein can be used to recoat a substrate already having a similar coating applied thereon without any impact on the desirable properties of the coating. Without limiting to theory, it is believed that the newly applied coating composition partially dissolves the previously applied coating such that the new coating appears as glossy and smooth as a coating applied over a previously uncoated substrate.

The coating composition described herein has the desirable properties of a conventional solution acrylic composition, with the added advantage of being a water-based composition. These properties include ease of application, fast dry times, good hardness, dirt pick-up resistance, early water resistance, blush resistance, durability and the ability to recoat. The coating composition also demonstrates optimal flow and leveling, high gloss and optimal penetration into a porous substrate. In addition, the coating composition described herein can be cut into an existing acrylic coating.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available.

Test Methods

Unless indicated otherwise, the following test methods were utilized in the Examples that follow.
Wet Look Assessment The wet look imparted to the substrate is tested by visual observation of coated test panels and correlates to both gloss and the proper wetting out of the substrate such that the natural color of the substrate is enhanced. The panels are rated on a scale of 1 to 5, with a rating of 5 indicating the optimal wet look.
Dry Time Test The time taken for the coating composition to dry on the surface of a substrate is determined by this test. The test method corresponds to the "dry through time" test as described in ASTM D5895 (Standard Test Methods for Evaluating Drying or Curing During Film Formation of Organic Coatings Using Mechanical Recorders). The dry-through time for a film is the time when the film has solidified or dried so completely that a large, twisting force can be applied without distorting the film. Optimally, the dry time for a coating composition is less than four hours.

Example 1

Preparation of Test Panels

Materials used in the examples are shown in Table 1 and Table 2 below.

TABLE 1

| Monomers | |
| --- | --- |
| Name | Abbreviation |
| Methyl methacrylate | MMA |
| Styrene | Sty |
| 2-ethyl hexyl acrylate | EHA |
| Butyl acrylate | BA |
| Methacrylic acid | MAA |
| Iso-butyl methacrylate | iBMA |

TABLE 2

| Solvents | |
| --- | --- |
| Solvent | Boiling point (° C.) |
| Aromatic 100 (hydrocarbon) | 161 |
| PCBTF (p-chlorobenzotrifluoride) | 139 |
| DPnB (glycol ether) | 230 |
| Texanol (ester alcohol) | 254 |
| PG (propylene glycol) | 188 |

The dispersions #1 to #8 listed in Table 3 were prepared using one of two methods:
1. Phase Inversion Concentration Method For each dispersion, the acrylic polymer was dissolved in solvent and weighed into a stainless steel flask. Appropriate amounts of surfactant and ammonia were added and the contents of the flask were mixed using a Cowls type blade at 1200 rpm. After 10 minutes of mixing, water was added in a dropwise manner until the mixture inverted from a water-in-oil to an oil-in-water emulsion. The mixture was held at that point for 10 minutes. The mixing speed was reduced to 600 rpm and additional water was added to make an emulsion including about 40% solids by weight.
2. Latex Polymerization Method Acrylic latexes were synthesized via conventional latex polymerization methods common in the industry. Upon completion, the appropriate amount of solvent was added. Dispersions made using either method were then formulated into a coating composition and applied to test panels that were allowed to dry to a solid film which was assessed for its wet look and the dry to touch time. Results are shown in Table 3.

TABLE 3

| | | | | | Performance Testing | | | | |
| --- | --- | --- | --- | --- | --- | --- | --- | --- | --- |
| No. | Monomers | Tg (° C.) | MW | Solvents | % polymer solids in solvent | solids wt % | Water wt % | Wet Look (0-5) | Dry to touch |
| 1 | MMA/EHA/MAA | 60 | 16,000 | Aromatic 100/DPnB | 64.1% | 18.4% | 71.3% | 4-5 | <4 hours |
| 2 | MMA/EHA/MAA | 60 | 22,000 | PCBTF/DPnB | 64.1% | 18.4% | 71.3% | 4 | <4 hours |
| 3 | iBMA/EHA/MMA/Sty | 17 | 25000 | PCBTF/PG | 57.3% | 19.3% | 66.3% | 2 | <4 hours |

TABLE 3-continued

Performance Testing

| No. | Monomers | Tg (° C.) | MW | Solvents | % polymer solids in solvent | solids wt % | Water wt % | Wet Look (0-5) | Dry to touch |
|---|---|---|---|---|---|---|---|---|---|
| 4 | MMA/BA/MAA | 7 | >100,000 | Texanol | 95.2% | 19.9% | 79.1% | 1 | <4 hours |
| 5 | Sty/EHA | 40 | 70,000 | Aromatic 100 | 20.0% | 20.0% | 0.0% | 5 | <4 hours |
| 6 | Sty/EHA | 40 | 70,000 | Aromatic 100 | 53.4% | 18.9% | 64.6% | 2 | <4 hours |
| 7 | MMA/BA/MAA | 30 | 8000 | Texanol | 50.0% | 18.0% | 64.0% | 4 | 5 days |
| 8 | MMA/BA/MAA | 30 | 8000 | DPnB | 50.0% | 18.0% | 64.0% | 4 | >8 hours |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A coating composition for a cementitious substrate, comprising:
   an aqueous dispersion comprising a polymer and an aqueous carrier, the polymer having a number average molecular weight greater than 5,000 and up to about 50,000, the polymer having a Tg of greater than 0° C., and the polymer derived from at least one ethylenically unsaturated monomer; and
   a combination of two or more organic solvents comprising:
      a first solvent having a boiling point between about 120° C. and 210° C.; and
      a second solvent having a boiling point between about 210° C. and 300° C.,
   wherein the polymer comprises about 40 to about 90 wt % of the total weight of the dispersion, not including the aqueous carrier, and the combination of the two or more organic solvents comprise about 10 to about 60 wt % of the coating composition based on the total weight of the dispersion, not including the aqueous carrier; and
   wherein the coating composition, when applied to the cementitious substrate and allowed to dry, provides a wet look.

2. The composition of claim 1, wherein the ethylenically unsaturated monomer is selected from acrylic acid, $C_1$-$C_{22}$ esters of acrylic acid, substituted $C_1$-$C_{22}$ esters of acrylic acid, methacrylic acid, $C_1$-$C_{22}$ ester of methacrylic acid, substituted $C_1$-$C_{22}$ esters of methacrylic acid, styrene, a-methyl styrene, acrylamide, N-substituted alkyl acrylamide, vinyl toluene, vinyl acetate, vinyl versatate, $C_1$-$C_{22}$ vinyl esters, $C_1$-$C_{22}$ esters of maleic acid, vinyl propionate, allyl methacrylate, and mixtures thereof.

3. The composition of claim 1, wherein the ethylenically unsaturated monomer is selected from styrene, methyl methacrylate, 2-ethyl hexyl acrylate, methacrylic acid, and combinations thereof.

4. The composition of claim 1, wherein the polymer is derived from a combination of methylmethacrylate, 2-ethyl hexyl acrylate and methacrylic acid.

5. The composition of claim 1, wherein the polymer has Tg of about 10° C. to about 80° C.

6. The composition of claim 1, wherein the first solvent has boiling point between 140° C. and 180° C.

7. The composition of claim 1, wherein the second solvent has boiling point between 210° C. and 260° C.

8. The composition of claim 1, wherein the polymer has number average molecular weight of about 15,000 to about 40,000.

9. The composition of claim 1, wherein the polymer has number average molecular weight of about 10,000 to about 30,000.

10. The composition of claim 1, wherein the combination of two or more organic solvents comprises about 10 to 50 wt % of the total weight of the dispersion, not including the aqueous carrier.

11. The composition of claim 1, wherein the polymer comprises about 40 to 90 wt % of the total weight of the dispersion, not including the aqueous carrier.

12. The composition of claim 1, wherein the dispersion comprises about 30 to 90 wt % water.

13. The composition of claim 1, wherein the dispersion further comprises a crosslinker.

14. The composition of claim 1, wherein the cementitious substrate includes a first coating applied thereon prior to the application of the coating composition.

15. The composition of claim 1, wherein the polymer is manufactured by a solution polymerization method.

16. The composition of claim 1, wherein the polymer is manufactured by a bulk polymerization method.

17. The composition of claim 1, wherein the polymer is manufactured by a dispersion polymerization method.

18. The composition of claim 1, wherein the polymer is manufactured by a latex polymerization method.

19. The composition of claim 1, wherein the dispersion is formed by emulsifying a solvated polymer into water.

20. A method of coating a cementitious substrate, comprising:
   applying on the cementitious substrate a coating composition comprising:
      an aqueous dispersion of a polymer and an aqueous carrier, the polymer having a number average molecular weight greater than 5,000 and up to about 50,000 and a Tg of greater than 0° C. and derived from at least one ethylenically unsaturated monomer;
      a combination of two or more organic solvents comprising:
         a first solvent having a boiling point between about 120° C. and 210° C.; and
         a second solvent having a boiling point between about 210° C. and 300° C., wherein the polymer comprises about 40 to about 90 wt % of the total weight of the dispersion, not including the aqueous carrier, and the combination of the two or more organic solvents comprise about 10 to about 60 wt % of the coating composition based on the total weight of the dispersion, not including the aqueous carrier; and allowing water to evaporate from the substrate to provide a coating with a wet look.

21. A coating composition for a cementitious substrate, comprising:

an aqueous dispersion comprising a latex polymer and an aqueous carrier, the latex polymer having a number average molecular weight greater than 5,000 and up to about 50,000, the latex polymer having a Tg of greater than 0° C., and the latex polymer derived from at least one ethylenically unsaturated monomer; and a combination of two or more organic solvents comprising:

a first solvent having a boiling point between about 120° C. and 210° C.; and a second solvent having a boiling point between about 210° C. and 300° C., wherein the latex polymer comprises about 40 to about 90 wt % of the total weight of the dispersion, not including the aqueous carrier, and the combination of the two or more organic solvents comprise about 10 to about 60 wt % of the coating composition based on the total weight of the dispersion, not including the aqueous carrier; and wherein the coating composition is devoid of a colorant or pigment, such that when the coating composition is applied to the cementitious substrate and allowed to dry, provides a clear wet look.

* * * * *